(12) United States Patent
Arimitsu

(10) Patent No.: US 6,867,560 B2
(45) Date of Patent: Mar. 15, 2005

(54) DRIVE OF ROTARY ELECTRIC MACHINE

(75) Inventor: Minoru Arimitsu, Kanagawa (JP)

(73) Assignee: Nissan Motor Co., Ltd., YOkohama (JP)

( * ) Notice: Subject to any disclaimer, the term of this patent is extended or adjusted under 35 U.S.C. 154(b) by 10 days.

(21) Appl. No.: 10/400,497

(22) Filed: Mar. 28, 2003

(65) Prior Publication Data

US 2003/0184245 A1 Oct. 2, 2003

(30) Foreign Application Priority Data

Apr. 1, 2002 (JP) .................................. 2002-098796

(51) Int. Cl.$^7$ .......................... H02P 5/34; H02K 16/00
(52) U.S. Cl. ...................... 318/144; 318/153; 318/730; 322/28; 310/112; 310/114
(58) Field of Search ............................. 318/700, 730, 318/801, 802, 811, 148, 153, 433, 798, 434; 310/112, 114, 152, 254, 258, 259, 179, 180, 184, 261; 322/19, 28, 13

(56) References Cited

U.S. PATENT DOCUMENTS

| | | | |
|---|---|---|---|
| 4,422,836 A | * 12/1983 | Meyman | |
| 5,355,297 A | * 10/1994 | Kawabata et al. | ............. 363/43 |
| 5,483,433 A | 1/1996 | Yang | |
| 5,744,895 A | * 4/1998 | Seguchi et al. | ............. 310/266 |
| 6,049,152 A | * 4/2000 | Nakano | ...................... 310/114 |
| 6,058,031 A | * 5/2000 | Lyons et al. | ................... 363/67 |
| 6,291,963 B2 | * 9/2001 | Nakano | ...................... 318/801 |
| 6,335,606 B1 | * 1/2002 | Minagawa et al. | ......... 318/801 |
| 6,355,999 B1 | * 3/2002 | Kichiji et al. | ............... 310/112 |
| 6,373,160 B1 | 4/2002 | Schrodl | |
| 6,376,955 B1 | * 4/2002 | Arimitsu | ..................... 310/114 |
| 6,384,567 B1 | * 5/2002 | Maeda | ........................ 318/801 |
| 6,429,562 B2 | * 8/2002 | Nakano et al. | ............. 310/113 |
| 6,455,976 B1 | * 9/2002 | Nakano | ...................... 310/254 |
| 6,472,788 B1 | * 10/2002 | Nakano | ...................... 310/114 |
| 6,472,845 B2 | * 10/2002 | Minagawa et al. | ......... 318/801 |
| 6,639,337 B1 | * 10/2003 | Nakano | ...................... 310/113 |
| 6,710,492 B2 | * 3/2004 | Minagawa | .................. 310/113 |
| 6,713,888 B2 | * 3/2004 | Kajiura | ..................... 290/40 F |
| 2002/0017892 A1 | 2/2002 | Arimitsu et al. | |
| 2002/0057065 A1 | 5/2002 | Arimitsu et al. | |

FOREIGN PATENT DOCUMENTS

| | | |
|---|---|---|
| JP | 5-308778 A | 11/1993 |
| JP | 10-108474 A | 4/1998 |
| JP | 11-146656 A | 5/1999 |
| JP | 11-356015 A | 12/1999 |
| JP | 2000-341964 A | 12/2000 |

OTHER PUBLICATIONS

U.S. Appl. No. 10/400,384, filed Mar. 28, 2003, Arimitsu et al.
U.S. Appl. No. 10/400,509, filed Mar. 28, 2003, Akatsu.

* cited by examiner

Primary Examiner—David Martin
Assistant Examiner—Eduardo Colon Santana
(74) Attorney, Agent, or Firm—Foley & Lardner LLP

(57) ABSTRACT

A rotary electric machine having a plurality of rotors is driven by a compound current. A voltage to be applied to a stator of the rotary electric machine is in the form of a compound rectangular or stepwise voltage composed of a plurality of superposed components each of which is a rectangular or stepwise wave having a frequency corresponding to the revolution speed of a unique one of the rotors.

8 Claims, 9 Drawing Sheets

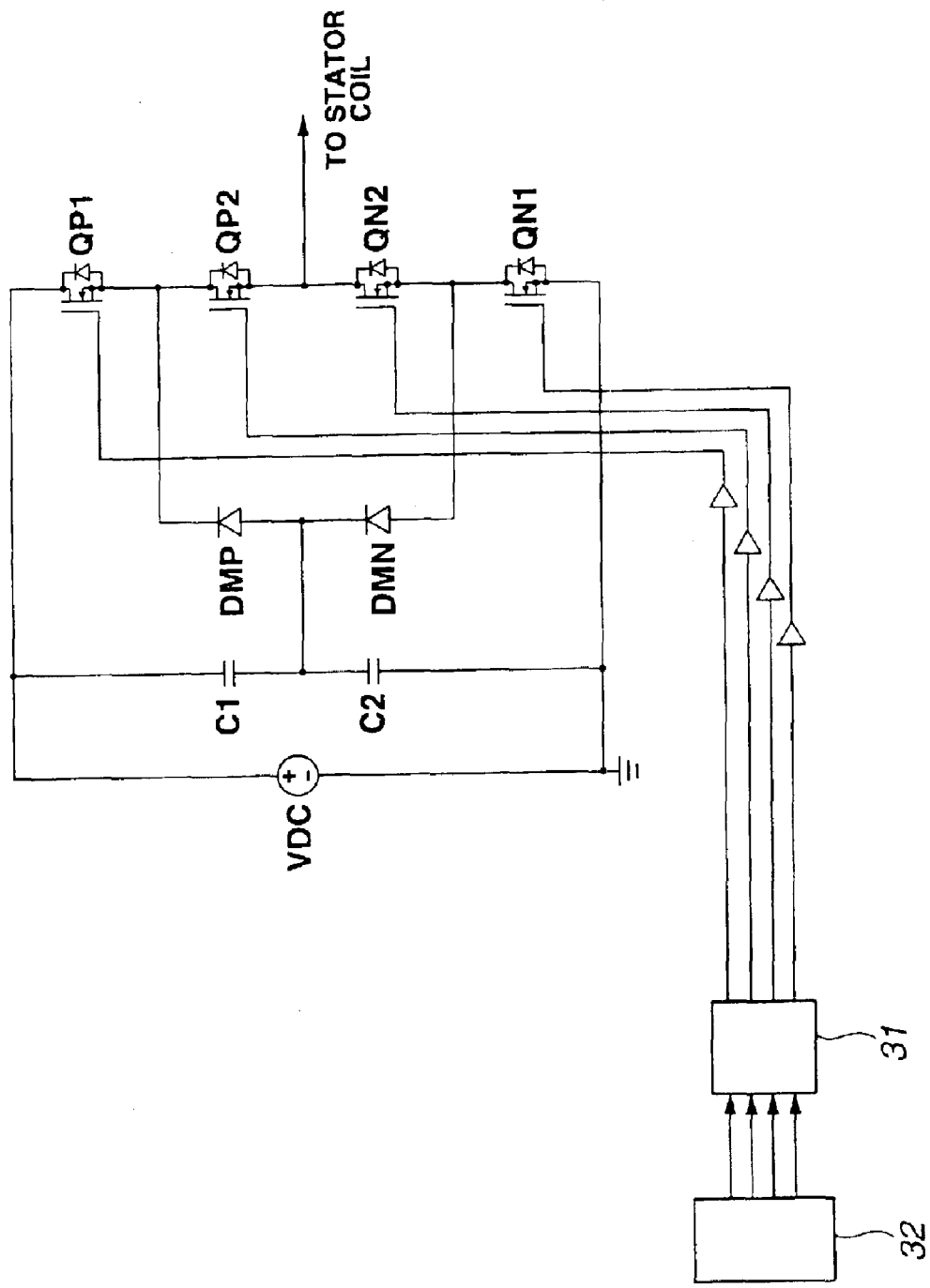

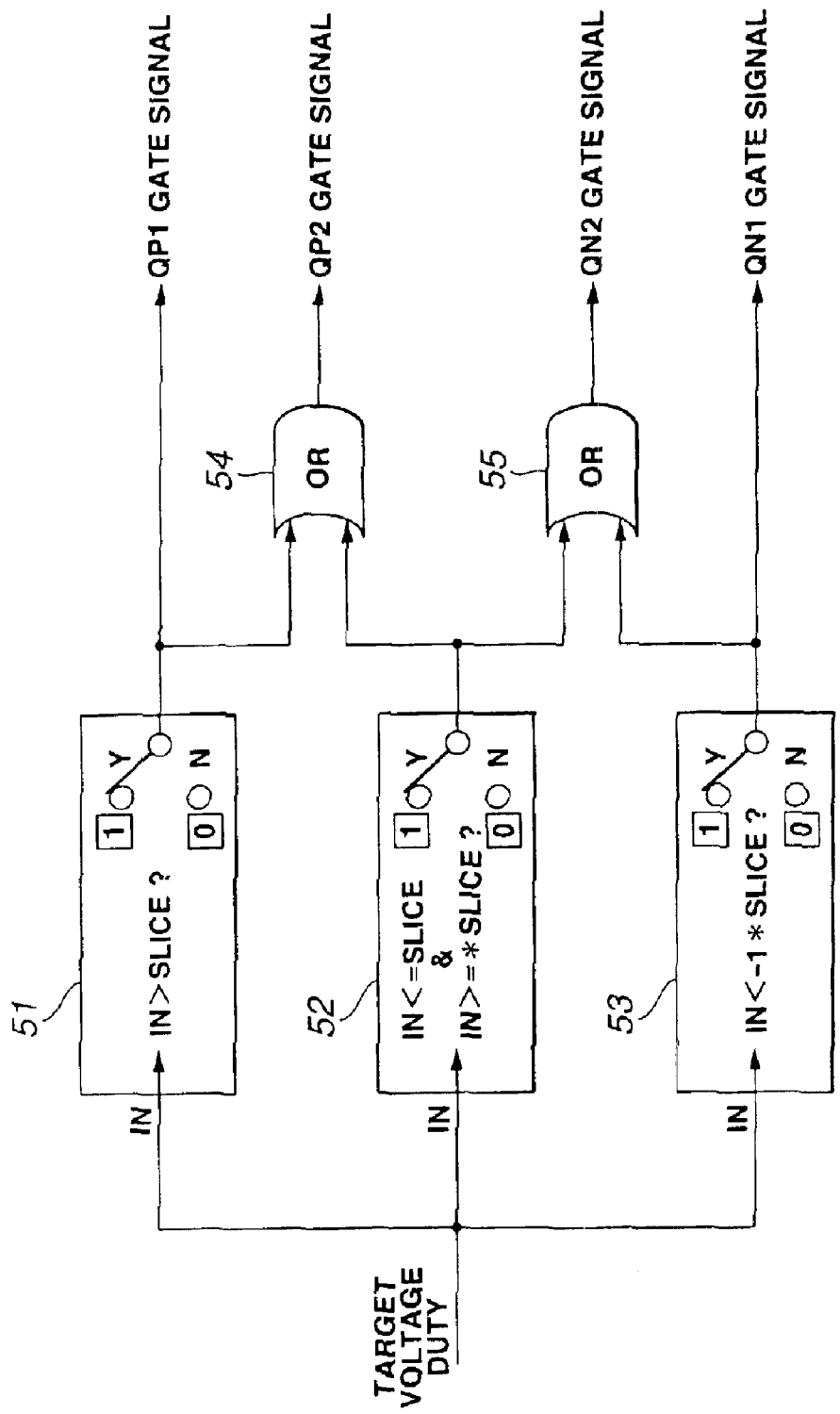

US 6,867,560 B2

DRIVE OF ROTARY ELECTRIC MACHINE

BACKGROUND OF THE INVENTION

The present invention relates to drive method and/or system for driving a rotary or rotating electric machine, and more specifically to drive method and/or system for driving a rotary electric machine having a plurality of rotors driven by a compound (or composite) current.

Published Japanese Patent Application Kokai No. H11 (1999)-356015 discloses a drive method of driving a rotary machine having a coaxial arrangement of a stator and two rotors, by supplying a compound current in the form of a sum of two sinusoidal waves from a (two-level) inverter.

SUMMARY OF THE INVENTION

It is an object of the present invention to provide electric rotary machine driving method and/or apparatus for decreasing a required capacity of a power device, reducing losses, and broadening a drive region.

According to the present invention, a method of driving a rotary electric machine having a plurality of rotors driven by a compound current, comprises: driving the rotary electric machine by applying, to a stator coil of the rotary electric machine, a voltage; and preparing the voltage to be applied to the stator coil, the voltage comprising a plurality of superposed components each of which is a rectangular wave having a frequency proportional to the revolution speed of a unique one of the rotors.

According to another aspect of the present invention, a drive system of driving a rotary electric machine having a plurality of rotors driven by a compound current, comprises: a first section to produce a compound voltage; and a second section to receive the compound voltage and producing the voltage to be applied to a stator coil of the rotary electric machine. The voltage to be applied to the stator coil comprises a plurality of components each of which is a rectangular wave having a frequency corresponding to the revolution speed of a unique one of the rotors.

The other objects and features of this invention will become understood from the following description with reference to the accompanying drawings.

BRIEF DESCRIPTION OF THE DRAWINGS

FIG. 7 is a circuit diagram a one-phase section for one phase of a three level inverter for producing the three level rectangular wave.

FIG. 9 is a block diagram showing a converting section of FIG. 8.

DETAILED DESCRIPTION OF THE INVENTION

An ordinary 2-level inverter is arranged to repeat an on-off operation at a duty ratio of 50% between ON(+V) and OFF(−V) to achieve zero voltage. Accordingly, in the case of an inverter-power-factor-zero drive mode of a multi-rotor machine (in which one rotor is operated as a motor and the other rotor is operated as a generator), notwithstanding the required voltage being zero, the system utilizing PWM drive repeats the on-off operation even in the vicinity of zero voltage at a peak of a compound current, and therefore entails great loss by the temporary flow of heavy current through a power device section during the ON period. At the same time, a switching loss is increased by the on-off operation of PWM at a high frequency of a level of several kHz. Moreover, the flow of heavy current increases the loss, and hence increases the required capacity of power devices. When a DC voltage is V, only V/2 can be used as the phase voltage, and voltages for the two or more rotors must be contained in V/2. Therefore, the DC voltage tends to be deficient especially in the high speed region, and the drive range is narrowed under this limitation. To handle high voltage, the system of earlier technology requires costly power devices, and tends to increase the cost. Moreover, the pulse drive for a normal motor is high in the inverter power factor though the loss is small as compared to the PWM drive. Therefore, the system requires power devices having large current capacity, and the system is disadvantageous for the inverter-power-factor-zero drive mode by the compound current. The drive method and system according to one embodiment of the present invention can meet these problems of the earlier technology.

Figure 1:
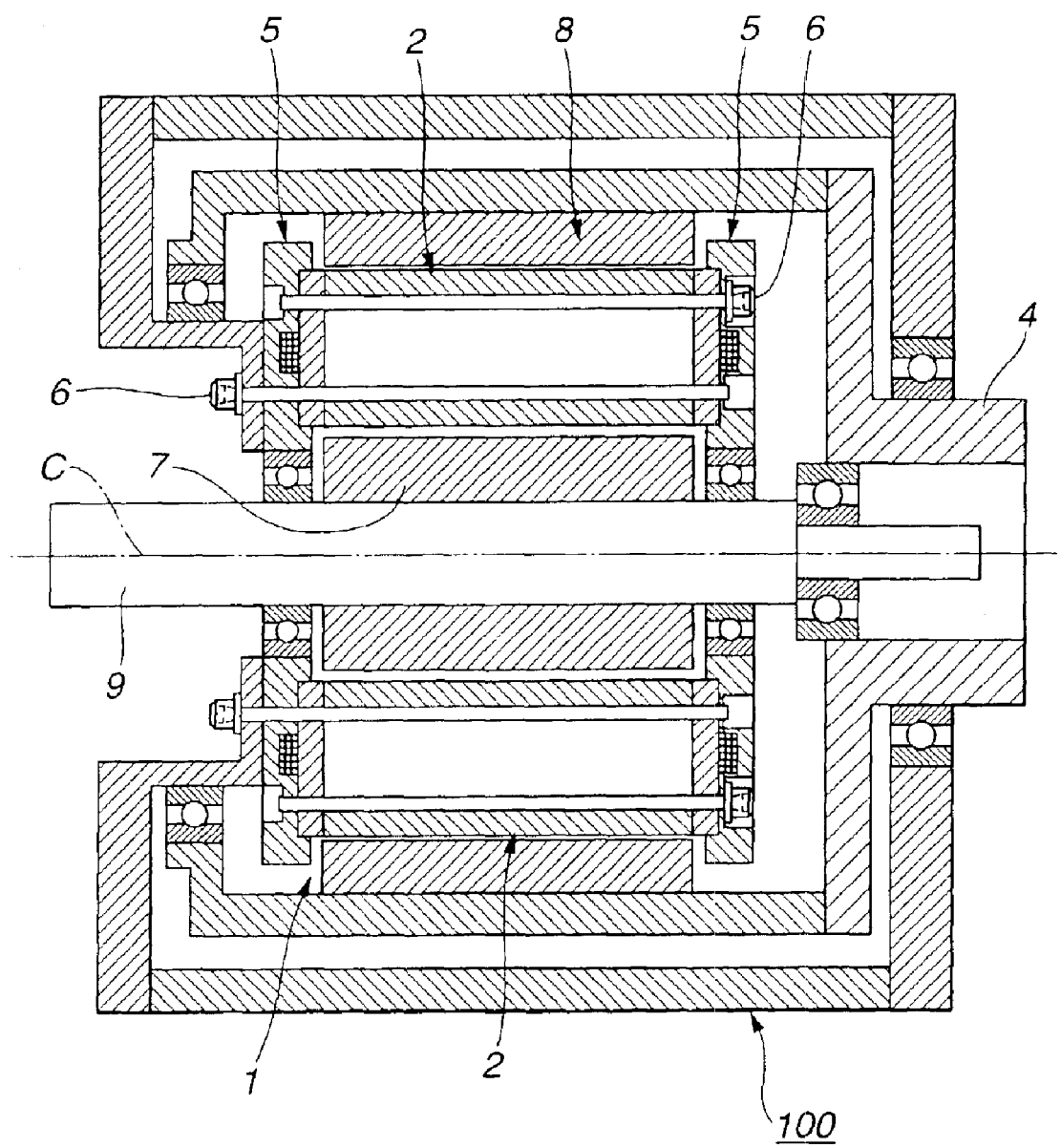
FIG. 1 is a sectional view showing a rotary electric machine which can be used in a drive method according to one embodiment of the present invention.

FIG. 1 shows a rotary electric machine 100 which can be driven by a driving method according to the embodiment of the present invention. This rotary machine has a coaxial multi rotor structure having an inner rotor 7, a stator 1 and an outer rotor 8 which are arranged coaxially on a center axis C of rotary machine 100. Inner rotor 7 is fixedly mounted on inner rotor shaft 9 whose center axis is coincident with the center axis C of rotary machine 100. Outer rotor 8 is fixed to an outer rotor shaft 4. Stator 1 is located radially between inner and outer rotors 7 and 8. Each rotor has magnetic poles. The number of magnetic pole pairs is different between inner rotor 7 and outer rotor 8.

Stator 1 includes a stator core 2 and two brackets 5 supporting both axial ends of stator core 2. Stator core 2 is clamped and supported by brackets 5. Bolts 6 extend axially through holes formed in brackets 5 and stator core 2, and fasten stator core 2 and brackets 5 together to form stator 1. Stator core 2 is composed of a plurality of stator pieces arranged in the circumferential direction. A coil is wound on each stator piece. Each stator piece is a laminate of layers of stator sheet steel.

The thus-constructed rotary electric machine 100 is driven by a compound or composite (multiple) current composed of superposed first and second component. The first component is a periodic wave of a first frequency f1 proportional to the revolution speed of one of the inner and outer rotors, and the second component is a periodic wave of a second frequency f2 proportional to the revolution speed of the other of the inner and outer rotors. The compound current produces a revolving magnetic field for each rotor, and causes each rotor to revolve. The revolving magnetic field of one rotor exerts no influence on the other rotor. Such an electrical machine having a common stator and a plurality of rotors is disclosed in U.S. Pat. No. 6,049,152. Explanations and figures of this U.S. Pat. No. 6,049,152 on a rotary electric machine or motor/generator, and drive circuit and method for driving the machine are hereby incorporated by reference.

By the driving method according to this embodiment of the present invention, each of the first and second periodic components is a rectangular (or stepwise) wave, instead of a sinusoidal wave as in an earlier technology. That is, the compound current supplied to the stator coil composed of the coils on the stator pieces is in the form of superposed rectangular waves having frequencies f2 and f2 proportional to the revolution speeds of the two rotors, respectively.

Figure 2A:
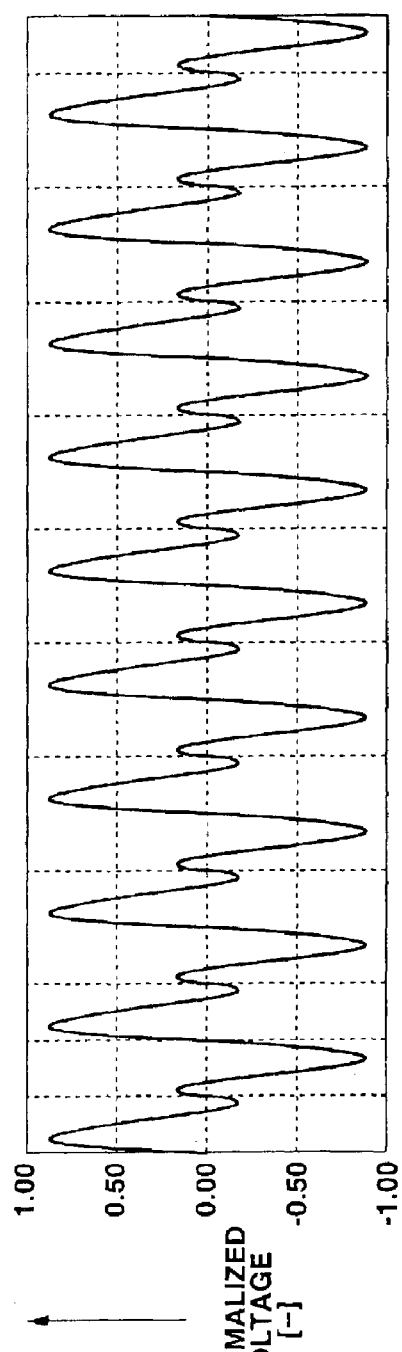
FIGS. 2A and 2B are graphs showing waveforms of a target compound voltage duty and a five level rectangular (or stepwise) wave converted from the target compound voltage duty in a first practical example of the embodiment.
Figure 2B:
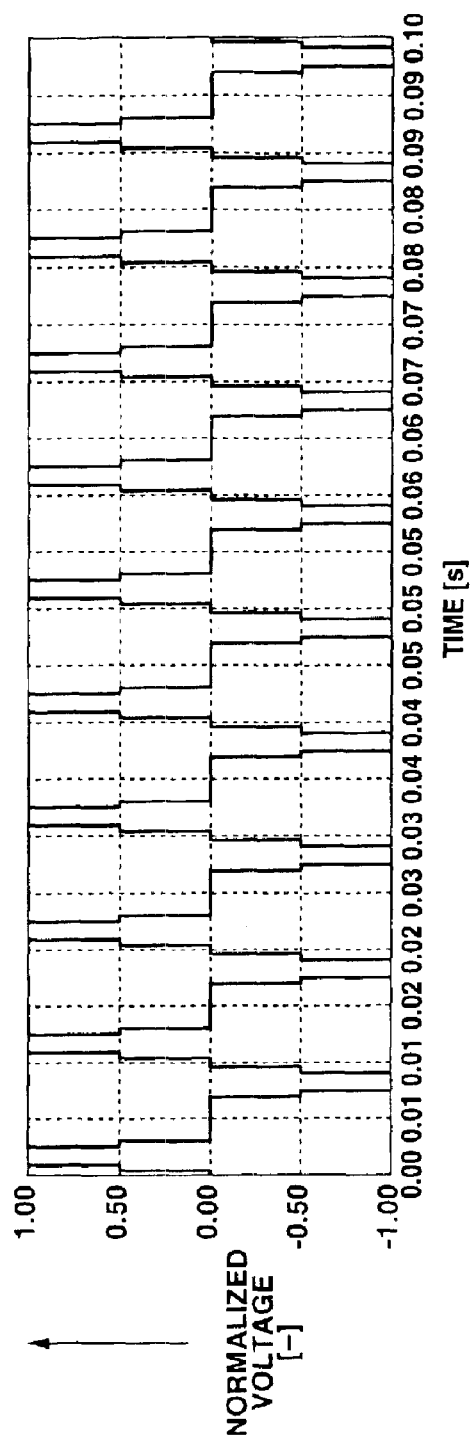

FIG. 2B shows a five level rectangular (stepwise) wave employed in a first practical example of the embodiment. The five level rectangular wave is obtained by conversion from a target compound voltage duty waveform shown in FIG. 2A. In each graph of FIGS. 2A and 2B, the vertical axis represents a normalized voltage, and the horizontal axis represents time. The compound wave of FIG. 2A is composed of a frequency component of 100 [Hz] and a frequency component of 200 [Hz]. In a driving method of an earlier technology, the output voltage wave to be applied to the stator coil is produced by PWM modulation of this target compound wave with a polyphase two level inverter. In this practical example, on the other hand, the five level rectangular waveform shown in FIG. 2B is used as the output voltage waveform applied to the stator coil. The five level rectangular wave of FIG. 2B contains a fundamental frequency of 100 [Hz] and a fundamental frequency of 200 [Hz].

Figure 3A:
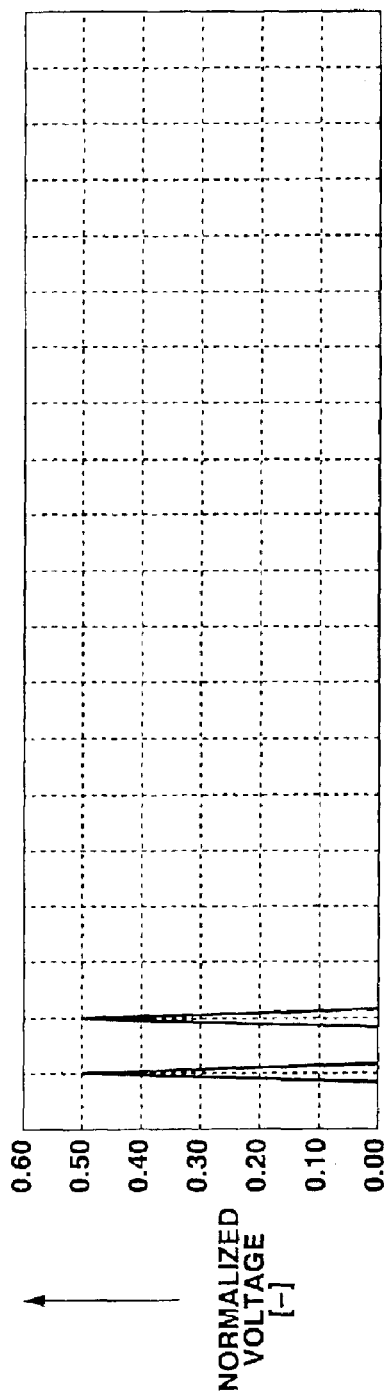
FIGS. 3A and 3B are graphs showing results of FFT analysis of the waveforms shown in FIGS. 2A and 2B, respectively.
Figure 3B:
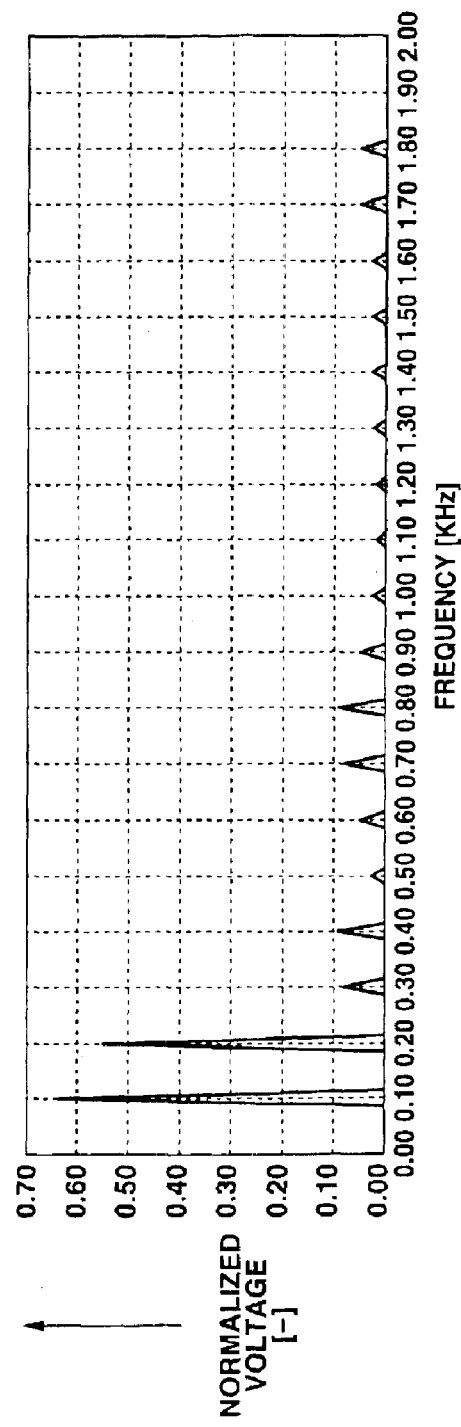

FIGS. 3A and 3B are graphs showing the results of FFT analysis on the waveforms of FIGS. 2A and 2B. In the transformation of FIGS. 3A and 3B, two values of 0.3 and 0.5 are used as slice levels. This choice is to reduce the percentage contents of higher harmonics by the FFT analysis. As evident from these figures, a spectral portion having an amplitude of 0.5 is converted to a peak having an amplitude greater than or equal to 0.5 in the five level rectangular wave. This means that the phase voltages can be increased. Though, in this example, the maximum voltage of the compound voltage duty is 1 (=0.5+0.5), this drive system can produce a compound voltage of 1.2 (=0.64+0.56) by the conversion to the five level rectangular wave. Therefore, this drive system can broaden the drive range of the motor. In the case of the rectangular wave, higher harmonic waves are produced. However, when used in the high revolution speed region, the current is reduced by the LC filter function of the rotary machine, and influences such as torque fluctuation are reduced. Furthermore, it is possible to reduce such higher harmonics by increasing the number of levels of the rectangular wave. This drive method does not employ the PWM modulation, and does not require high speed switching operation. Therefore, this drive method can improve the efficiency of the inverter.

Figure 4:
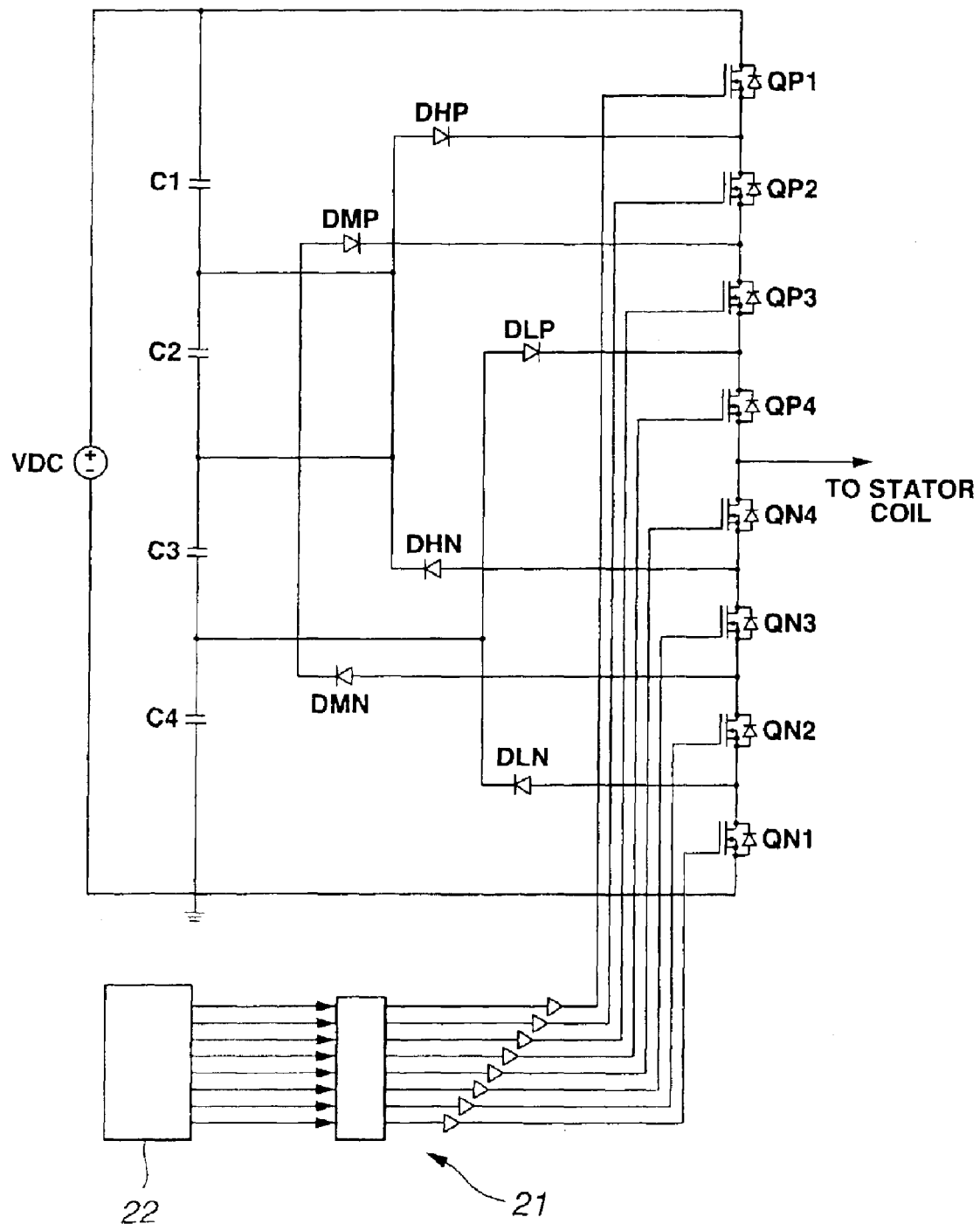
FIG. 4 is a circuit diagram a one-phase section for one phase, of a five level inverter for producing the five level rectangular wave.

FIG. 4 shows a five level inverter for producing five level rectangular (or stepwise) waves as shown in FIG. 2B. FIG. 4 shows a circuit section corresponding to one phase. The circuit section of the five level inverter shown in FIG. 4 includes a source of voltage VDC; capacitors C1, C2, C3, C4 and C5; diodes DHP, DHN, DMP, DMN, DLP and DLN; power devices QP1, QP2, QP3, QP4, QN1, QN2, QN3 and QN4; a gate driver 21 and a compound voltage command generating section 22.

The five level inverter of FIG. 4 is operated in the following manner. The target compound voltage duty shown in FIG. 2A is divided by slice levels into 5 levels. All the power devices on the P side are ON when the five level rectangular wave is at the level of 1. Power devices QP2, QP3, QP4 and QN4 are ON when the five level rectangular wave is at the level of 0.5. Power devices QP3, QP4, QN4 and QN3 are ON when the five level rectangular wave is at the level of 0. Power devices QP4, QN4, QN3 and QN2 are ON when the five level rectangular wave is at the level of −0.5. All the power devices on the N side are ON when the five level rectangular wave is at the level of −1. These operations are repeated thereafter.

Figure 5A:
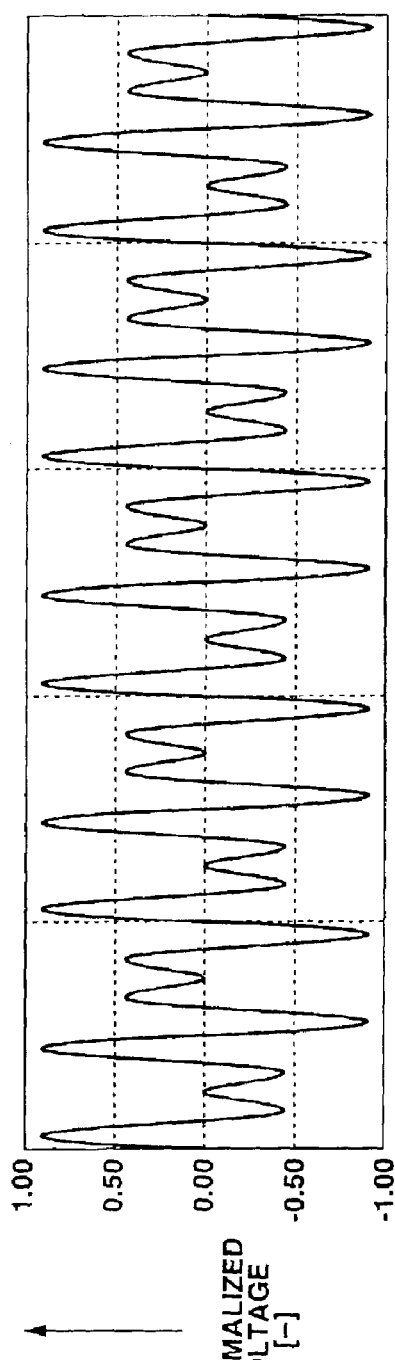
FIGS. 5A and 5B are graphs showing waveforms of a target compound voltage duty and a three level rectangular (or stepwise) wave converted from the target voltage duty of FIG. 5A in a second practical example of the embodiment.
Figure 5B:
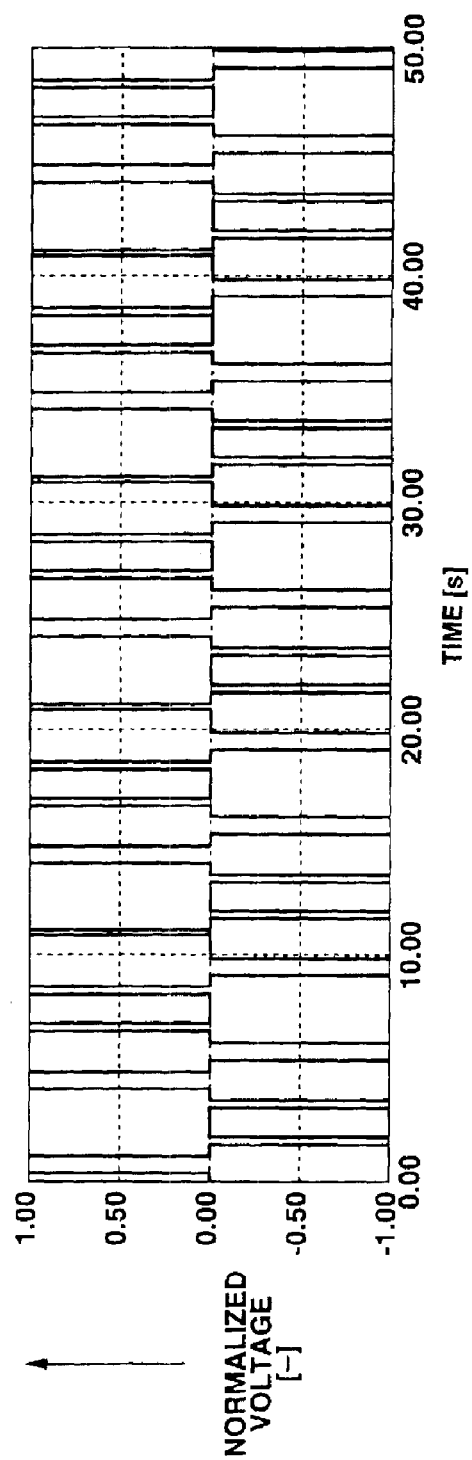

FIG. 5B shows a three level rectangular (stepwise) wave employed in a second practical example of the embodiment. The three level rectangular wave is obtained by conversion from a target compound voltage duty waveform shown in FIG. 5A. In each graph of FIGS. 5A and 5B, the vertical axis represents a normalized voltage, and the horizontal axis represents time. The compound wave of FIG. 5A is composed of a frequency component of 300 [Hz] and a frequency component of 500 [Hz]. The three level rectangular wave of FIG. 5B contains fundamental frequencies of 300 [Hz] and 500 [Hz]. In this practical example, the three level rectangular waveform shown in FIG. 5B is used as the output voltage waveform applied to the stator coil.

Figure 6A:
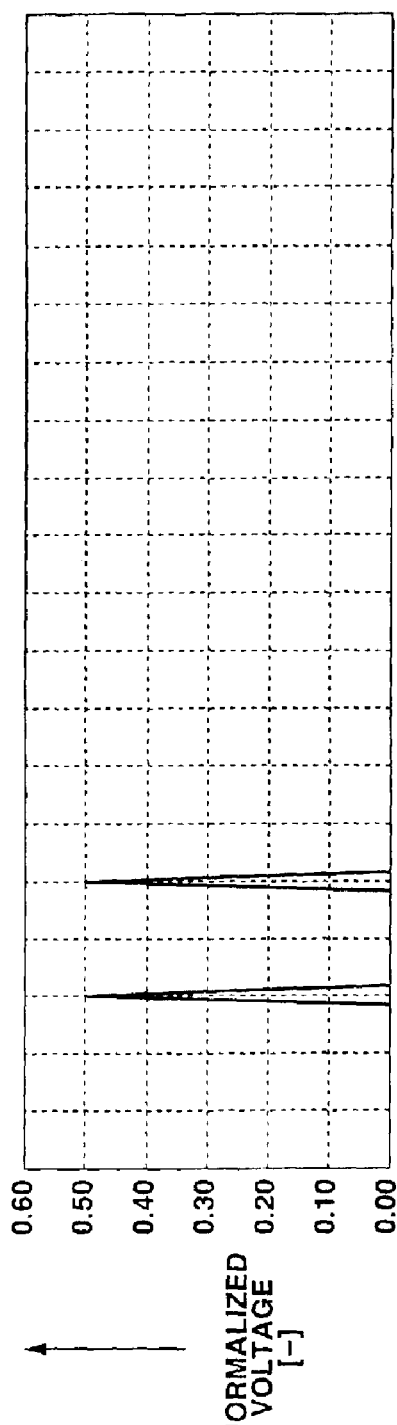
FIGS. 6A and 6B are graphs showing results of FFT analysis of the waveforms shown in FIGS. 5A and 5B, respectively.
Figure 6B:
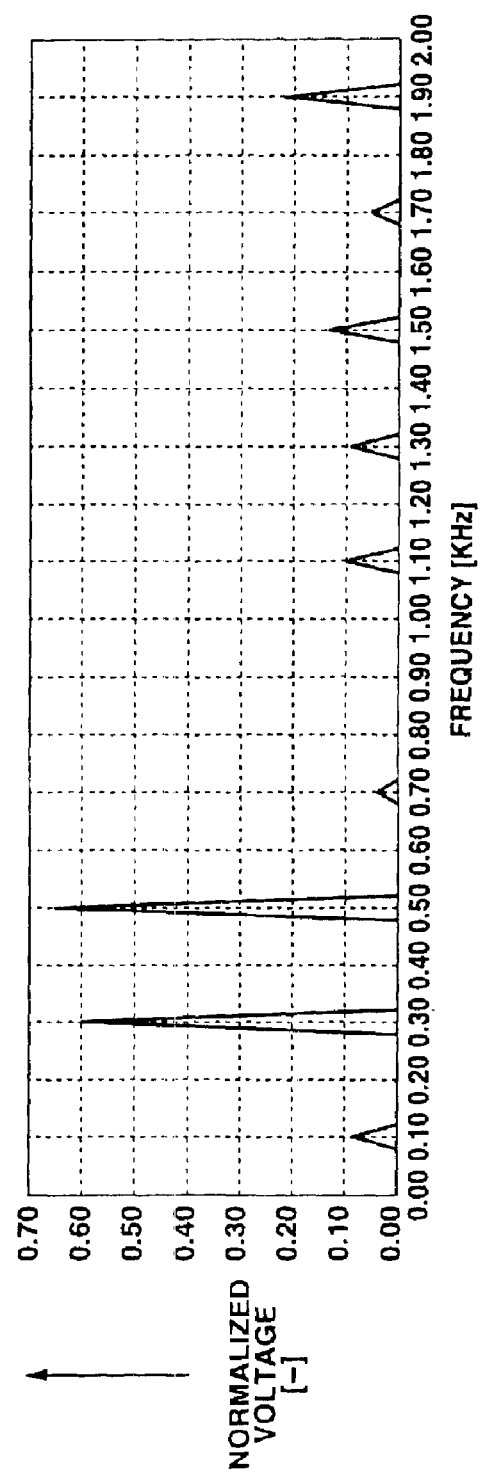

FIGS. 6A and 6B are graphs showing the results of FFT analysis on the waveforms of FIGS. 5A and 5B. As evident from these figures, a spectral portion having an amplitude of 0.5 is converted to a peak having an amplitude greater than or equal to 0.5 in the three level rectangular wave, as in the first practical example. This means that the phase voltages can be increased. Though, in this example, the maximum voltage of the compound voltage duty is 1 (=0.5+0.5), this drive system can produce a compound voltage of 1.25 (=0.60+0.65) by the conversion to the three level rectangular wave. Therefore, this drive system can broaden the drive range of the motor. In the case of the rectangular wave, higher harmonic waves are produced. However, when used in the high revolution speed region, the current is reduced by the LC filter function of the rotary machine, and influences such as torque fluctuation are reduced. In this example, a low frequency component is produced. However, undesired influence can be avoided by countermeasures such as optimization of a trigger signal for drive pulses so as to reduce the low frequency component.

FIG. 7 shows a three-level inverter for producing three level rectangular waves as shown in FIG. 5B. The circuit shown in FIG. 7 is a circuit section for one phase. The circuit section of the three-level inverter shown in FIG. 7 includes a source of voltage VDC; capacitors C1 and C2; diodes DMP and DMN; power devices QP1, QP2, QN1 and QN2; a gate driver 31 and a compound voltage command generating section 32. In the practical example of FIG. 7, the effects of the present invention can be achieved with a circuit configuration with the minimum number of power devices and other components to the advantage of cost reduction.

The three level inverter of FIG. 7 is operated in the following manner. The target compound voltage duty shown in FIG. 5A is divided by slice levels into 3 levels. All the power devices on the P side are ON when the three level rectangular wave is at the level of 1. Power devices QP2 and QN2 are ON when the three level rectangular wave is at the level of 0. All the power devices on the N side are ON when the three level rectangular wave is at the level of −1. These operations are repeated thereafter.

Figure 8:
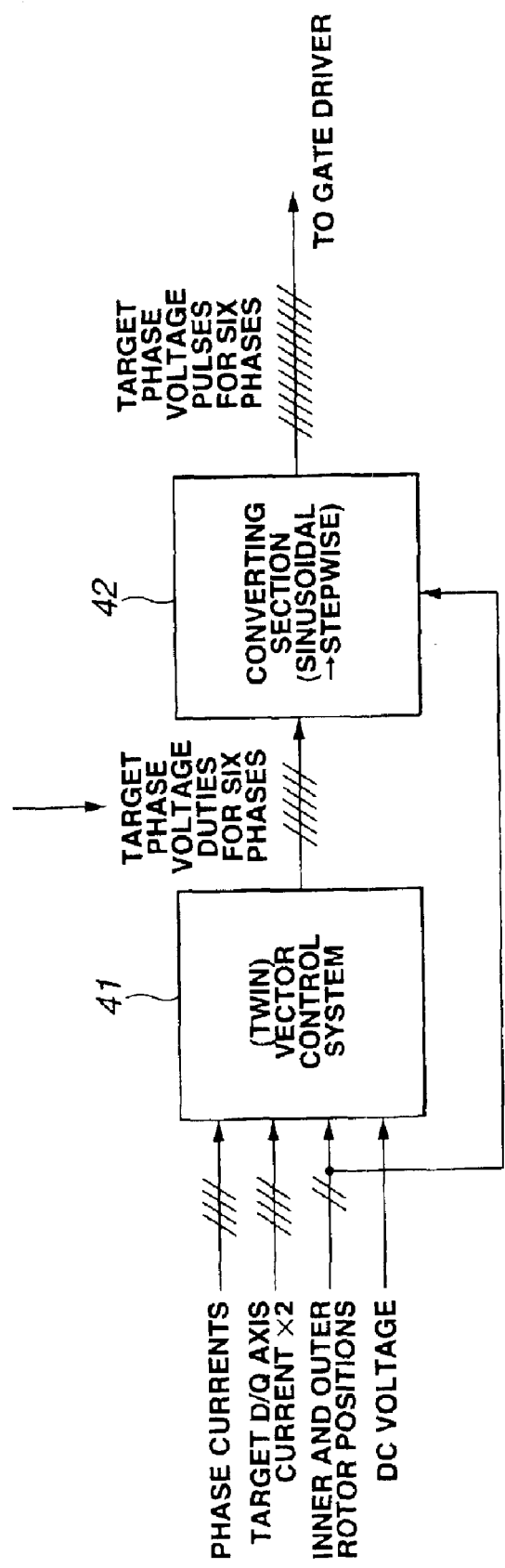
FIG. 8 is a block diagram showing a compound voltage command generating section employed in the embodiment according to the present invention.

FIG. 8 shows a compound voltage command generating section which can be used as section 22 shown in FIG. 4 or section 32 in FIG. 7. The compound voltage command generating section of FIG. 8 includes a (twin) vector control system 41 and a converting section 42 for conversion from a sinusoidal superimposed compound waveform to a rectangular or stepwise waveform. In this example, the system is designed to perform a six phase drive in a twelve phase system (two inner pole pairs and 3 outer pole pairs in the rotary machine having two coaxial rotors). Vector control system 41 receives, as inputs, phase currents for 4 phases, two target current vectors, inner and outer rotor positions, and DC voltage. From these inputs, the (twin) vector control system 41 calculates target compound voltage duties for six phases to achieve the target current. This target compound voltage duty is a sum of two sine waves having frequencies for the inner and outer rotors. This section is substantially the same as a control system of earlier technology. Converting section 42 receives, as inputs, the target compound voltage duties and inner and outer rotor positions; and produces the N level rectangular waves, which are supplied to the gate driver.

FIG. 9 shows converting section 42 of FIG. 8, more in detail. The converting section of FIG. 9 is for a three level inverter as shown in FIG. 7. The converting section of FIG. 9 includes comparators 51, 52 and 53; and OR gates 54 and 55. Each of comparators 51, 52 and 53 receives the target voltage duty, compare the target voltage duty with a slice level, and thereby produce drive signals for four power devices. When the target voltage duty has a waveform as shown in FIG. 5A, then the slice level is set equal to 0.5. When target voltage duty>slice level, comparator 51 turns on, and the converting section produces a QP1 gate signal and a QP2 gate signal. When −(slice level)≦target voltage duty≦slice level, comparator 52 turns on, and the converting section produces the QP2 gate signal and a QN2 gate signal. When target voltage duty<−(slice level), comparator 53 turns on, and the converting section produces the QN2 gate signal and a QN1 gate signal. The converting section of FIG. 9 is simple in logic and configuration with comparators for comparison with slice levels for N levels.

The drive system of the illustrated embodiment according to the present invention, as mentioned above, is arranged to superpose rectangular waveforms having fundamental frequencies f1 and f2. Therefore, this drive system and method can make the amplitudes of f1 and f2 greater as compared to the superposition of sinusoidal waves of f1 and f2 for a given DC voltage. Since the induced voltage is proportional to the revolution speed, this drive system and method can increase the range of the motor drive mode. This drive system is arranged to produce a stepwise waveform by using N level voltage without the need for switching operations as in the PWM drive system. Therefore, this drive system and method can significantly reduce the loss in the inverter section due to high speed switching. By increasing the number N of the levels, the drive system can reduce higher harmonic waves. Moreover, the configuration of the N level inverter can decrease the rated voltage of a power device. By using the inverter power factor zero drive mode, it is possible to decrease the rated current of a power device, excepting FWD. Therefore, this system is advantageous in cost.

The capacities of power devices can be made smaller from a feed point toward the P side arm or N side arm. This arrangement can decrease the cost by decreasing the capacities of power devices in a drive system for a multi-shaft rotary electric machine frequently operated in a generator mode. In the drive mode in which the power factor is zero, the current is near zero when the voltage is high (all the power devices on the VDC's side). Therefore, it is possible to decrease the current capacity. In the illustrated embodiment, the drive pulses of the power devices are produced by conversion from a normalized compound voltage by using (N−1) slice levels. This is implemented by a simple system for comparison with the slice levels, without increasing the memory capacity and without improving the performance of CPU. This simple system can be formed merely by adding a small capacity control block, without changing a conventional current control system largely. This system can perform torque control and weak field control as in a conventional system.

This application is based on a prior Japanese Patent Application No. 2002-098796 filed in Japan on Apr. 1, 2002. The entire contents of the prior Japanese Patent Application No. 2002-098796 are hereby incorporated by reference.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. A method of driving a rotary electric machine having a plurality of rotors driven by a compound current, the driving method comprising:

driving the rotary electric machine by applying, to a stator coil of the rotary electric machine, a voltage; and preparing the voltage to be applied to the stator coil, the voltage comprising a plurality of superposed components each of which is a rectangular wave having a frequency proportional to the revolution speed of a unique one of the rotors.

2. The method as claimed in claim 1, wherein the voltage to be applied to the stator coil includes N level potentials of ±V/(N−1) [V], ±V/(N−3) [V], . . . ±V/2 [V], and 0 [V] where V is a drive DC voltage [V], and N is an odd number equal to or greater than 3.

3. The method as claimed in claim 2, wherein the voltage to be applied to the stator coil is produced by an N level inverter including power devices, the number of the power devices being equal to 2×(N−1).

4. The method as claimed in claim 3, wherein capacities of the power devices are made smaller from a feed point toward one of a P side arm and an N side arm.

5. The method as claimed in claim 3, wherein drive pulses of the power devices are produced by conversion from a normalized compound voltage by using (N−1) slice levels.

6. The method as claimed in claim 3, wherein N is equal to three.

7. A drive system of driving a rotary electric machine having a plurality of rotors driven by a compound current, the driving system comprising:

a first section to produce a compound voltage; and a second section to receive the compound voltage and to produce the voltage to be applied to a stator coil of the rotary electric machine, wherein the voltage to be applied to the stator coil comprises a plurality of components each of which is a rectangular wave having a frequency corresponding to the revolution speed of a unique one of the rotors.

8. The drive system as claimed in claim 7, wherein the second section comprises an N level inverter, and the voltage to be applied to the stator coil includes N level potentials where N is an odd number equal to or greater than 3.

* * * * *